Dec. 27, 1938.　　　H. HORLACHER　　　2,142,029
COMBINED DELAYED TRIP AND SPINDLE STOP MECHANISM FOR MACHINE TOOLS
Filed June 23, 1937　　　5 Sheets-Sheet 1

INVENTOR.
HERMAN HORLACHER
BY
AHKParsons
ATTORNEY.

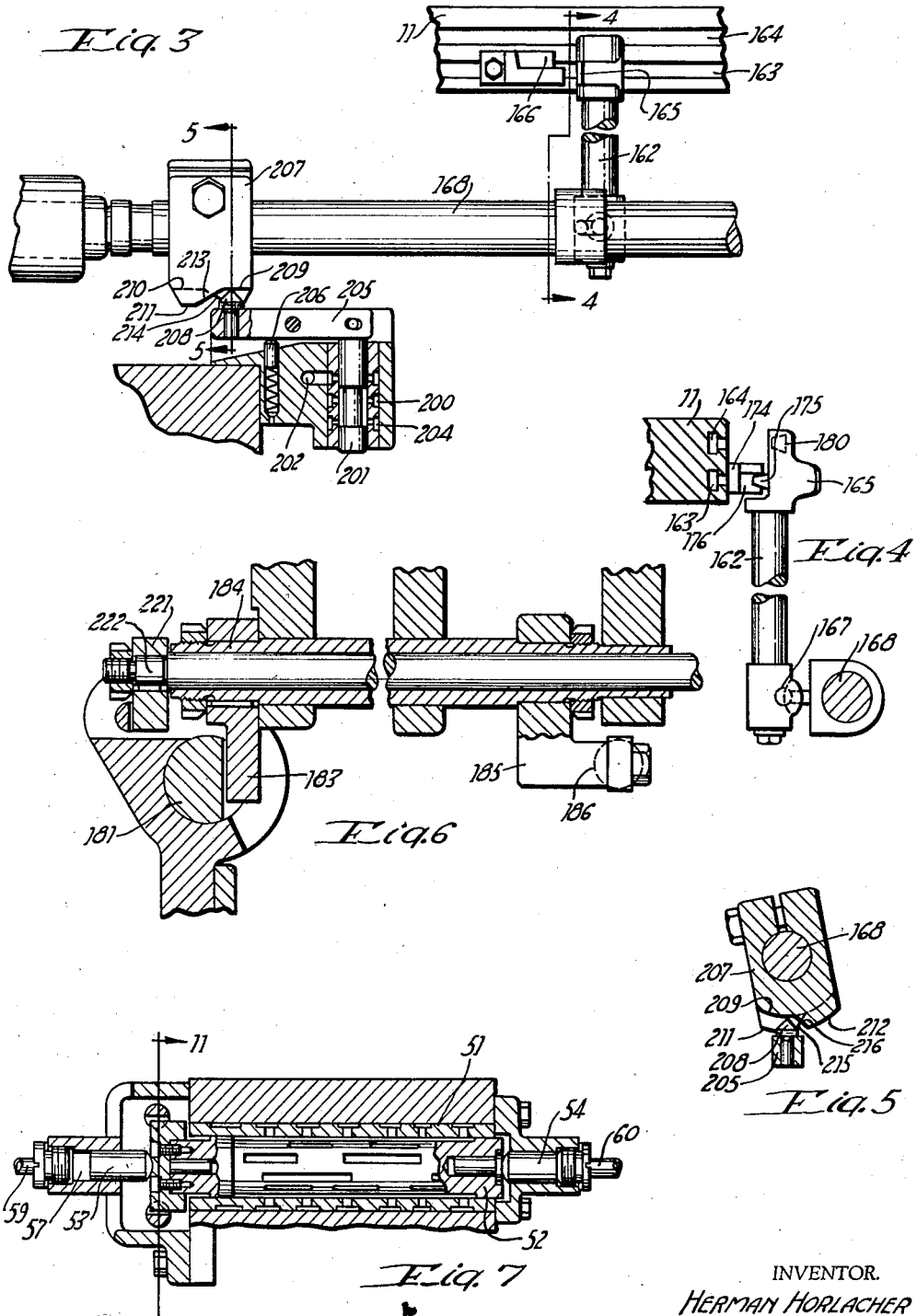

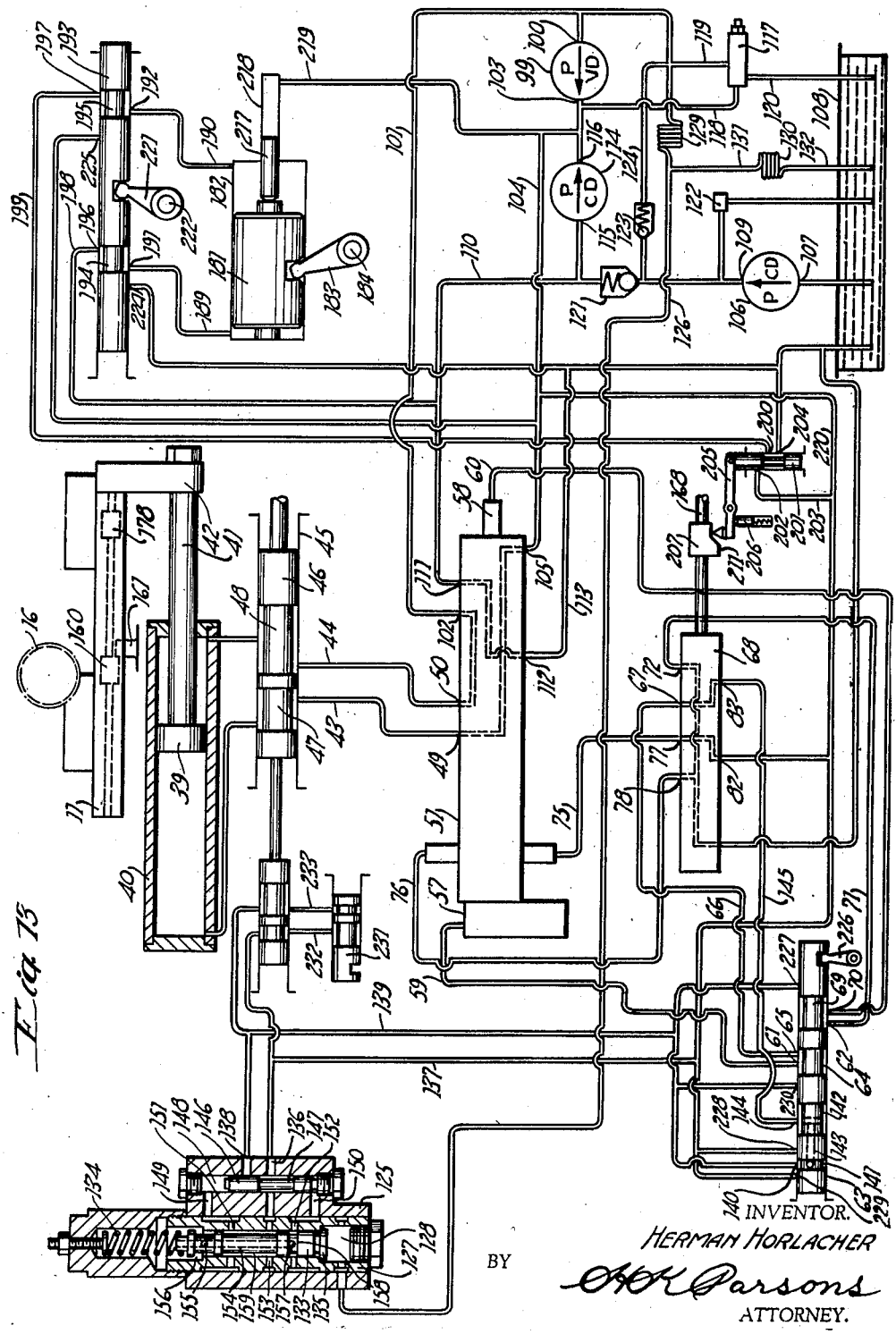

Patented Dec. 27, 1938

2,142,029

UNITED STATES PATENT OFFICE 2,142,029

COMBINED DELAYED TRIP AND SPINDLE STOP MECHANISM FOR MACHINE TOOLS

Herman Horlacher, Cincinnati, Ohio, assignor to The Cincinnati Milling Machine Company, Cincinnati, Ohio, a corporation of Ohio Application June 23, 1937, Serial No. 149,849

20 Claims. (Cl. 90—21.5)

This invention relates to milling machines and more particularly to improvements in transmission and control mechanism therefor.

One of the objects of this invention is to provide a new and novel control mechanism for the transmission of a milling machine whereby improved coordination between the movements of the spindle and the movements of the work table may be obtained.

Another object of this invention is to combine a delayed trip mechanism and a spindle stop mechanism in a single transmission for a milling machine.

A further object of this invention is to improve the control of a milling machine so that a delayed trip may be selectively available at either or both ends of table travel and in conjunction with a spindle stop mechanism which does not become effective until after the delayed trip mechanism has performed its function.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 3 is a detail view showing certain parts of the trip mechanism.

Figure 4 is a detail section on the line 4—4 of Figure 3.

Figure 5 is a detail section on the line 5—5 of Figure 3.

Figure 6 is a sectional view showing the connections between the spindle clutch shifter rod and its operating piston.

Figure 7 is a sectional view through the rate and direction selector valve.

Figure 8:
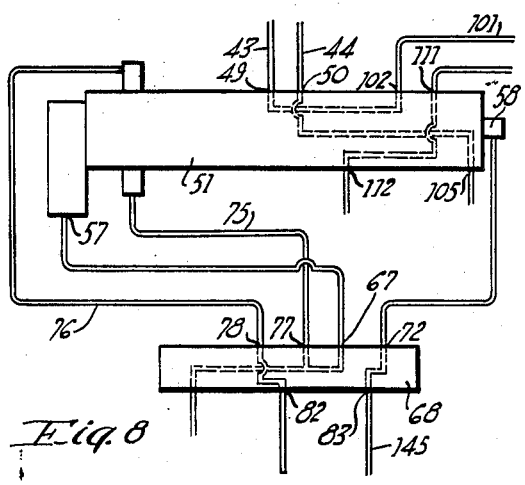
Figure 9:
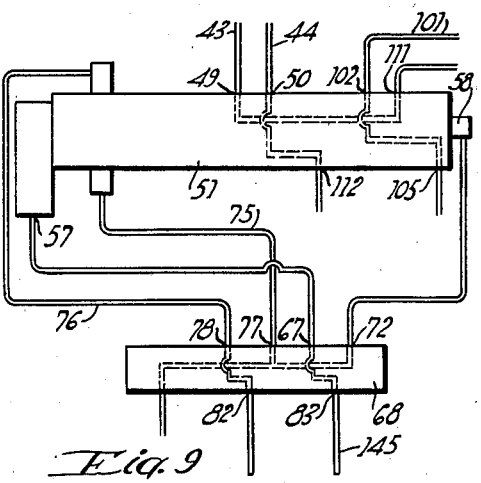
Figure 10:
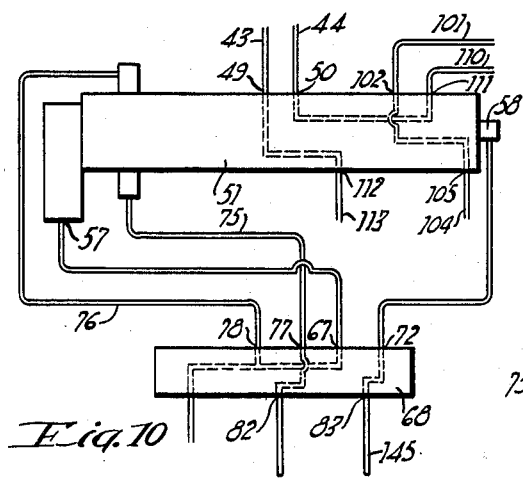

Figures 8, 9, and 10 are diagrammatic views showing the different connections between the pilot valve and the selector valve for obtaining different rates and directions of movement.

Figure 11:
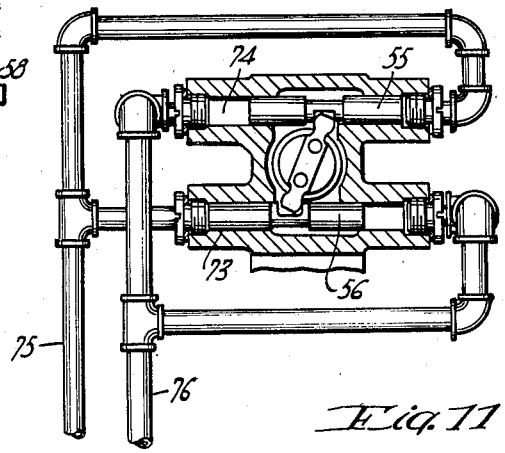

Figure 11 is a sectional view on the line 11—11 of Figure 7.

Figure 12:
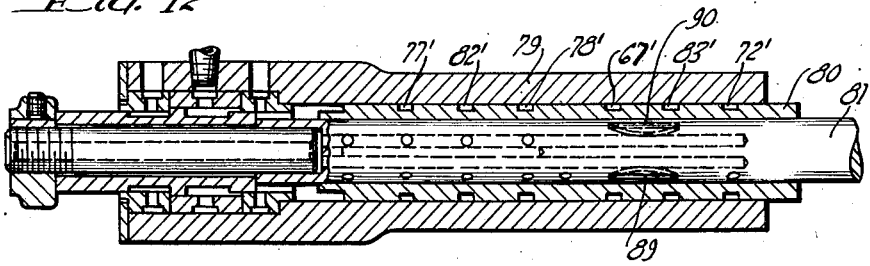

Figure 12 is a sectional view through the pilot valve.

Figure 13 is a diagrammatic view of the hydraulic control circuit.

Figure 14:
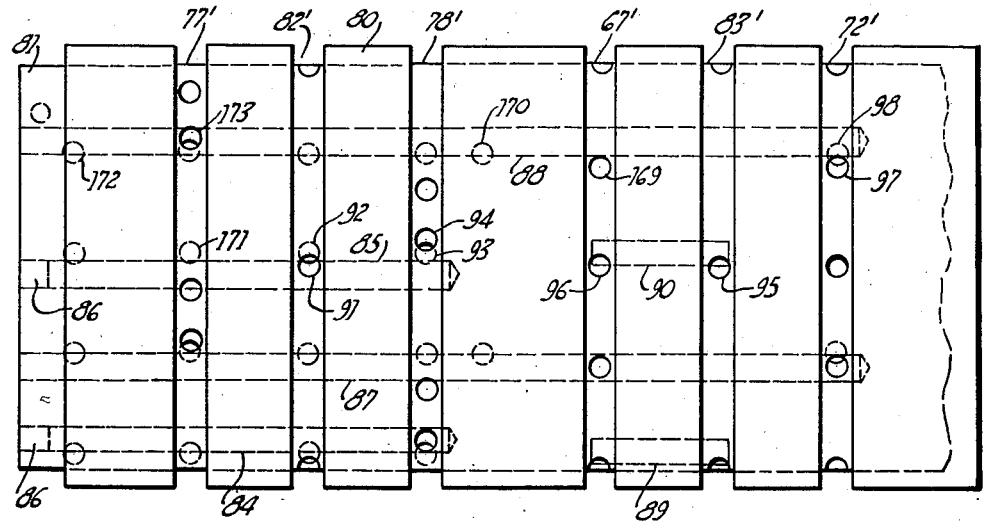

Figure 14 is an expanded view of the pilot valve sleeve and plunger with the parts shown in feed right position.

Figure 1:
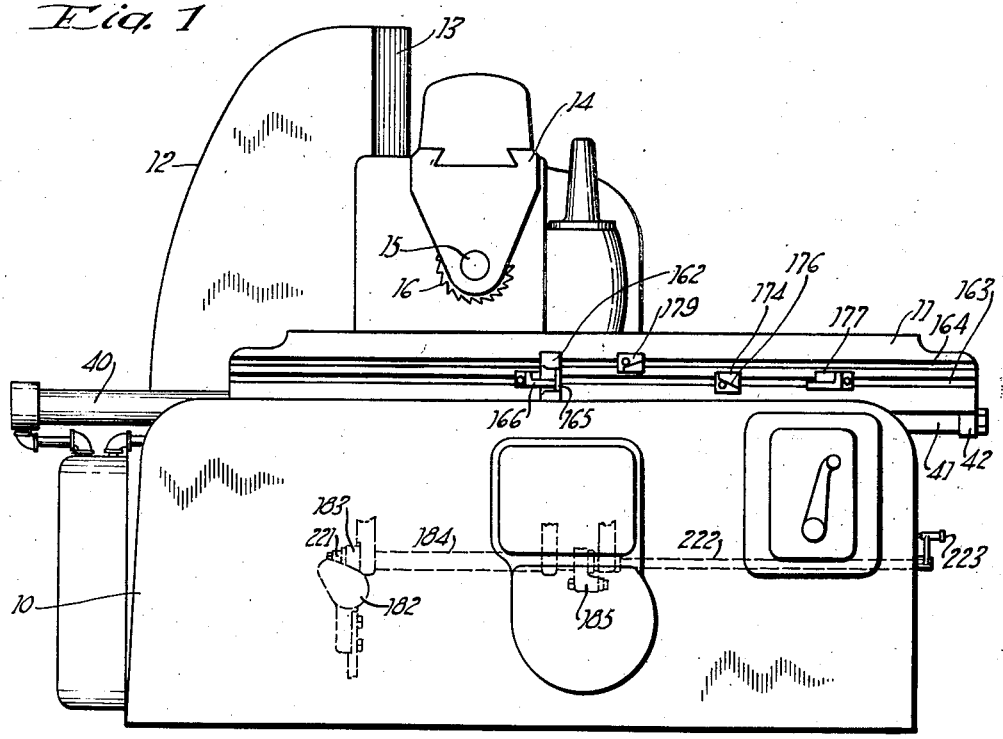
Figure 1 is an elevation of a machine tool embodying the principals of this invention.

In Figure 1 of the drawings there is shown a conventional form of hydraulically operated milling machine in which the reference numeral 10 indicates the bed of the machine upon the top of which are formed guideways for supporting a reciprocable work table 11. Integral with the bed is an uprising column 12 upon which are formed vertical guideways 13 for receiving and supporting a spindle carrier 14. This carrier supports a spindle 15 for driving a milling cutter 16.

Figure 2:
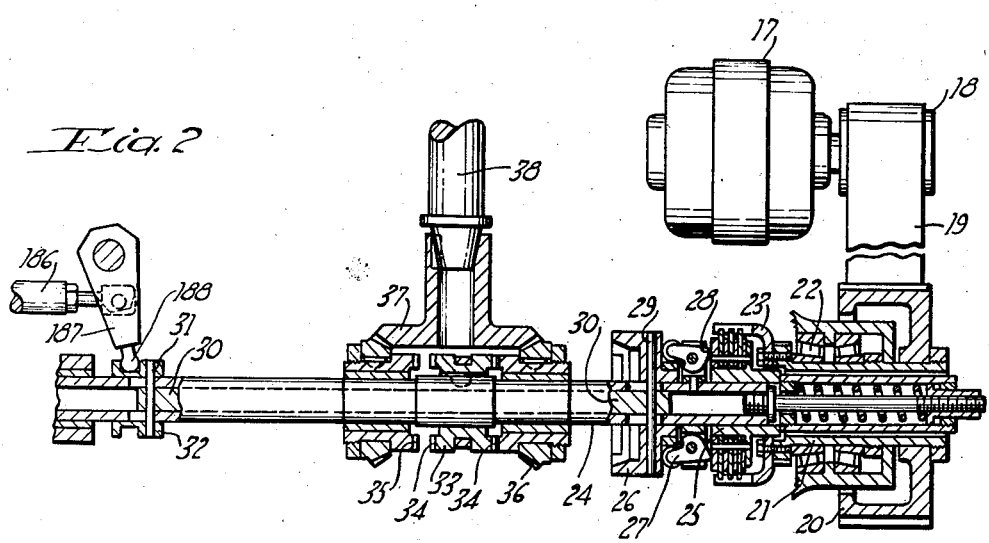
Figure 2 is a detail view of certain control parts of the spindle transmission.

As shown in Figure 2, the spindle may be actuated by a prime mover 17, which may be in the form of an electric motor, having a driving pulley 18 which is connected by suitable motion transmitting means, such as a belt 19, to a driven pulley 20. This pulley is integral with a sleeve 21 which is supported for rotation on antifriction bearings 22 carried by the bed of the machine, and the sleeve terminates in a multiple disc clutch member 23.

A driven shaft 24 is supported in axial alignment with the sleeve 21 and this shaft has the other half 25 of the multiple disc friction clutch fixed therewith. Engagement of the clutch is effected by the shifter 26 which, upon movement toward the right, outwardly cams the pivoted members 27 which have cam surfaces 28 for pressing together the series of friction plates to cause a driving engagement.

The shifter 26 is connected by a diametrical pin 29 to a rod 30 which is slidable through the center of the hollow shaft 24. The other end of the rod 30 is connected by a pin 31 to a shiftable spool 32 which is slidable relative to the shaft 24 to effect engagement and disengagement of the clutch.

A sliding clutch member 33 is splined on the shaft 24 for rotation thereby and has clutch teeth 34 formed on opposite ends thereof for interengagement with similarly formed clutch teeth 35 integral with bevel gears 36. These gears interengage with a large bevel gear 37 which is keyed to the end of a vertical shaft 38. When the shaft 24 rotates, it will, through the clutch member 33, rotate the bevel gears 36 selectively in opposite directions whereby opposite directions of rotation of the cutter spindle may be obtained, and thus the clutch 33 serves as a reverser for the spindle. The vertical shaft 38 is connected through suitable gearing in the spindle carrier for rotation of the spindle at variable rates.

The table 11 is reciprocated by a piston 39, more particularly shown in Figure 13, which is contained in a cylinder 40, and is connected by a piston rod 41 to one end of the table by the depending bracket 42. A pair of channels 43 and 44 are connected to opposite ends of the cylinder for the purpose of supplying fluid to one end and withdrawing fluid from the other end to cause movement of the table in opposite directions. A stop valve 45 is interposed in these channels and has a plunger 46 in which are formed annular grooves 47 and 48 for connecting the channels to the respective ends of the cylinder, but upon movement of the plunger to the right, one of the annular grooves serves to disconnect the cylinder from the supply portion of the channels and at the same time interconnect these portions so that the supplying fluid is short-circuited to the return line.

The channels 43 and 44 terminate in ports 49 and 50 respectively of a rate and direction selector valve 51. This valve, as shown in Figure 7, has a rotatable and axially movable plunger 52 which may be rotated to two positions and axially moved to two positions, thereby giving a combination of four positions. Each one of these positions changes either the rate or the rate and direction of movement of the table, as will be more fully explained hereafter.

Hydraulic means have been provided for shifting this plunger into these various positions, and consists of a pair of fluid operable plungers 53 and 54 which shift the valve axially and an additional pair of plungers 55 and 56, as shown in Figure 11, for rotating the plunger. The cylinders 57 and 58, which contain the pistons 53 and 54 respectively, are connected by channels 59 and 60 to ports 61 and 62 of a delayed trip selector valve 63.

The selector valve 63 has a central position, in which position it is shown in Figure 13, for causing a delay in the reversal of the table at each end of its stroke, and additional positions on each side of the central position for selectively causing a delay at one end or the other end of the table stroke and with no delay at the remaining end of the table stroke.

When this valve is in its central position, an annular grove 64 in the valve connects port 61 to port 65 and thereby through channel 66 to port 67 of a pilot valve 68. A second annular groove 69 connects port 62 to port 70 and thereby through channel 71 to port 72 of the pilot valve. This results in the cylinder 58 of the selector valve being connected to port 72 of the pilot valve and the cylinder 57 being connected to the port 67, whereby it will be apparent that upon connection of pressure to one of these ports and with the other port connected to exhaust, that the selector valve plunger may be shifted axially by hydraulic means into either one of two positions.

The plungers 55 and 56 which rotate the valve are slidably mounted in cylinders 73 and 74 respectively and one end of each of these cylinders is connected to channel 75 and the remaining end of each cylinder is connected to channel 76, which channels terminate in ports 77 and 78 of the pilot valve. It will now be apparent that upon admission of pressure by the pilot valve to one of these ports and the connection of the other to exhaust, the selector valve may be rotated selectively into either one of two positions.

As shown in Figure 12, the pilot valve consists of a housing 79 in which is tightly fitted a sleeve 80 having a series of annular grooves spaced axially thereof and a valve plunger 81 which is slidable and rotatable relative to the sleeve to effect four different sets of connections between the grooves in the sleeve and thereby effect the four different positions of the selector valve. The pilot valve has a pressure port 82 which is located between the ports 77 and 78 and the pilot valve is provided with means for selectively connecting this port to either one of the ports 77, 78. The pilot valve is provided with a second pressure port 83 which is located between the ports 67 and 72 for selective connection therewith. Attention is invited to the fact that the port 82 is directly connected to a pump and is therefore always under pressure, while the supply of pressure to port 83 is controlled by a delay valve mechanism and therefore will not receive pressure at the end of a table stroke until the prescribed time of delay has elapsed.

In order to more fully understand the construction and operation of the pilot valve, the plunger and the sleeve are shown rolled out in Figure 14. In this view the sleeve 80 is shown in full lines and the plunger 81 is shown in dash and dot lines. The annular groves 77', 82', 78', 67', 83' and 72' are permanently connected when the sleeve is inserted in the housing with ports 77, 82, 78, 67, 83 and 72 respectively.

The plunger 81 is provided with two longitudinally extending bores 84 and 85 which only extend about half the length of the plunger and the open ends of these bores are closed by suitable plugs 86. The plunger also has a second pair of longitudinally extending bores 87 and 88, and these remain open at one end so as to serve as exhaust bores or channels. In addition, the plunger 81 has a pair of arcuate shaped slots 89 and 90 cut in its periphery and so positioned longitudinally of the valve plunger that it may selectively connect the pressure groove 83' to either of the grooves 67', 72'. It will be noticed that the lower half of the valve layout in Figure 14 is similar to the upper half and this is for the purpose of hydraulically balancing the parts. For the purposes of explanation, it is therefore only necessary to describe the connections made by one half of the valve, it being understood that a similar set of duplicate connections is made by the other half of the valve.

In Figure 13 the table 11 is shown as moving toward the right and in order to effect the necessary connections to cause this direction of movement, the selector valve plunger must be shifted to its right hand position. In Figure 14 the pilot valve plunger is shown in the position that will result in the necessary hydraulic connections to cause the selector valve to take up its right hand position. The groove 82', which is continuously under pressure, has a radial hole 91 which is in alignment with a radial hole 92 formed in the pilot valve plunger and communicating with the longitudinal bore 85. This bore is connected by a radial hole 93 in the plunger with the radial hole 94 in the annual groove 78', which means that the line 76 is under pressure and that the selector valve is rotated clockwise, as viewed in Figure 11. In addition, the slot 90 is in a position to connect the groove 83', which may be considered as a pressure groove, to annular groove 67', through the radial holes 95 and 96 in the respective grooves, whereby the channel 66 is under pressure and the selector valve plunger is shifted toward the right. Channel 60 from the other end of the selector valve and terminating in port 72 of the pilot valve is connected through annular groove 72' and radial holes 97 and 98 to the longitudinal channel 88 which leads to reservoir. It will now be seen that the pilot valve determines the position of the selector valve and the selector valve determines the rate and direction of movement of the table.

Two different sources of pressure are provided for causing the feeding movements and the rapid traverse movement of the table. In Figure 13 a variable delivery pump 99 causes the feeding movements at variable rates dependent upon the setting of the pump. This pump has an intake 100 which is connected by channel 101 to port 102 of the selector valve. It also has a delivery port 103 which is connected by channel 104 to port 105 of the selector valve. During feeding movement, the ports 102 and 105 are connected to opposite ends of the cylinder 40, whereby it becomes evident that a closed circuit is provided for actuation of the table, the pump withdrawing fluid from one end of the cylinder and delivering it under pressure into the other end of the cylinder. The rapid traverse movement is effected by the constant displacement pump 106 which has an intake 107, through which fluid is withdrawn from a reservoir 108, and a delivery port 109, which is connected by channel 110 to port 111 of the selector valve. During a feeding movement of the table, the rapid traverse pump is not being utilized and to eliminate the necessity of carrying a high pressure in channel 110, the rapid traverse pump is connected to reservoir by the selector valve. In other words, the port 111 is connected to port 112 from which a channel 113 extends to reservoir 108.

Due to the fact that the piston rod 41 extends through only one end of the cylinder, it will be apparent when fluid is being withdrawn from the right hand end of the cylinder by the feed pump 99 that there will not be sufficient volume to maintain the necessary volumetric delivery to the other end, and this difference is made up by a booster pump 114 which has an intake 115 connected to channel 110 and a delivery port 116 which is connected to the pressure channel 104.

When the other set of connections are made and the feed pump 99 is withdrawing fluid from the left end of the cylinder 40, it will be apparent that there will be an excessive flow of fluid in order to maintain the other end of the cylinder filled, and to take care of this a differential relief valve 117 is provided which has a channel connection 118 to the pressure side of the V. D. pump 99, and a second channel connection 119 to the intake side of the V. D. pump, whereby the pressure differential across the pump can be measured, and when the differential is too great, the valve will open and bypass fluid to reservoir through channel 120.

For the purposes of maintaining the system full of oil, a check valve 121 is provided in the channel 110 to prevent oil draining out of the system to reservoir when the pump 106 is shut down. In addition, an emergency relief valve 122 may be connected to channel 110 to insure that the pressure does not rise beyond safe limits therein.

It will be noted that a check valve 123 is interposed in the line 124 which connects the delivery channel 110 of the rapid traverse pump to the return line 101 of the feed pump, and this is to insure that the pressure does not drop below certain limits in the return line to the feed pump.

For the purposes of causing a delay at the time of reversal of the table, a delay valve mechanism 125 is provided, and a connection 126 is made between the port 127 of the delay valve mechanism and the return line 101 to the feed pump 99. To prevent sudden fluctuations of pressure in the chamber 128 in the delay valve mechanism during the feeding movement, a choke coil 129 is interposed in the line 126 thereby insuring more positive operation of the parts. Since the pressure in chamber 128 does not have to be as high as the pressure in the return line 101, which point it would eventually reach if no other means were provided, a second choke coil 130 has been provided wh'ch has one end connected by the branch 131 to channel 126 and the other end connected through branch 132 to reservoir. This provides, in effect, an intermediate chamber connected by a resistance "in", that is, the choke coil 129 which is connected to pressure, and a resistance "out", that is, the choke coil 130 which leads to reservoir. In accordance with the values of these resistances, a pressure in the intermediate chamber can be obtained at some intermediate point between the pressure in channel 101 and atmospheric pressure. This intermediate pressure will, however, vary in accordance with variations in the supplying pressure, which in this case is the channel 101. It thus becomes possible to provide a plunger 133 in the delay valve mechanism having one end in communication with chamber 128 and the other end in engagement with an adjustable spring 134 which acts in a direction to continuously urge the plunger against the pressure in chamber 128 whereby, when the pressure in this chamber drops below a predetermined limit, the plunger 133 will move downward. By providing an enlarged head 135 on the end of the plunger, its movement in one direction may be limited, thereby positively maintaining the valve parts associated with the plunger in a definite position and regardless of how high the pressure might go, but upon reduction of pressure below a predetermined l'mit, the plunger will move and establish new connections.

The delay valve mechanism has a port 136 which is connected by channel 137 to the delivery channel 104 of the feed delivery pump, whereby the port 136 is continuously under pressure.

This mechanism is provided with a second port 138 which is connected by channel 139 to port 140 of the delayed trip selector valve 63. In the present position of this latter valve, an annular groove 141 connects port 140 to annular groove 142 in the plunger through an interdrilled passage 143. The annular groove has a port 144 in communication therewith and connected by channel 145 to port 83.

A shuttle valve plunger 146 is reciprocably mounted in the delay valve 125 for movement relative to ports 136 and 138. This plunger has an annular groove 147 which will interconnect ports 136 and 138 when the valve is moved to its upper position, but when it drops down into the position shown, it will disconnect these ports. This plunger is slidable in a bore 148 which has ports 149 and 150 at opposite ends and connected respectively to ports 151 and 152 adjacent plunger 133.

The plunger 133 has a pressure port 153 which is in constant communication with pressure port 136. The plunger 133 has an axial bore 154 which is open at the upper end so as to serve as a reservoir connection, and this bore is intersected by a radial hole 155 formed in the annular groove 156, whereby this groove becomes a reservoir groove; and by a second radial hole 157 formed in the annular groove 158 whereby this groove becomes a reservoir connection. A third annular groove 159 is formed in the plunger and is of such length as to be in constant communication with the pressure port 153.

It will now be apparent that during the normal feeding movement of the table and with the normal desired back pressure in the channel 101 that the plunger 133 of the delay valve will be held in the position shown in Figure 13 against the compression of spring 134 and that the pressure port 153 will be connected by the annular groove 159 to port 151 thereby admitting pressure to the upper end of bore 148 and holding the shuttle valve plunger downward in a position to disconnect port 138 from the pressure port 136.

When a dog 160 carried by the rear of the table engages the positive stop 161 carried by the bed, movement of the table will stop, but the feed pump 99 will still be withdrawing fluid from the right hand end of the cylinder and delivering it to the other end. This will immediately cause the back pressure in channel 101 to drop and thereby reduce the pressure in chamber 128 of the delay valve, whereby the plunger 133 will start to move downward under the pressure of spring 134. This movement will continue until the port 153 is connected by the groove 159 to port 152, whereby the pressure fluid will flow through port 152 into the lower end of bore 158 and move the shuttle valve plunger upward and thereby position the groove 147 for interconnection of ports 136 and 138. The pressure in line 137 will then flow through line 139, selector valve 63 and channel 145 to port 83 of the pilot valve 68.

Although the drop in pressure in channel 101 causes the operation of the delay valve mechanism, the length in time of the delay will depend upon how fast the fluid in chamber 128 can be forced through the resistance 130, and the length of time may be varied by varying the value of this resistance. Although a fixed resistance such as a coil of fine bore tubing has been conventionally illustrated, it will be appreciated and understood that a conventional form of adjustable throttle valve may be substituted therefor.

It will be appreciated that before the table can start moving in the opposite direction, that the selector valve 51 must be shifted into a new position in order to effect the necessary connections. Therefore, means have been provided for trip operation of the pilot valve from the table and this mechanism comprises an oscillatable and axially movable trip plunger 162 which as shown in Figure 1, is located adjacent the front side of the table for actuation by suitable trip dogs fastened in the T-slots 163 and 164 formed in the table 11. This plunger is provided with a wing 165 and as the table moves toward the right and just prior to engagement with the stop 161, a trip dog 166 fastened in the T-slot 163 engages the wing 165 of the plunger and rotates it into the position shown in Figure 1. When this has been accomplished, the dog 160 engages the positive stop 161 and prevents further movement toward the right.

As shown in Figure 4, the lower end of the trip plunger is connected by a universal joint 167 to the pilot valve trip rod 168. This rod is an axial extension of the pilot valve plunger. It will be noted from Figures 3 and 4 that the trip plunger 162 is rotated in such a direction as to shift the pilot valve to the right. Referring to Figure 14, it will be noted that when the pilot valve plunger is shifted to the right, that the slot 90 interconnects the pressure groove 83' with the groove 72' whereby the pressure is now delivered to the cylinder 58 located on the right hand end of the selector valve, thereby shifting the selector valve to the left. The fluid in the opposing cylinder 57 is returned to reservoir through the annular groove 67' and the radial hole 169 in the groove which now is in alignment with the radial hole 170 in the plunger which intersects the exhaust channel 88.

The rotary position of the selector valve will be unaffected because a radial hole 171 which intersects the longitudinal channel 85 in the plunger is in alignment with the hole 91 in the pressure groove 82, whereby the bore 85 is still supplied with fluid pressure. The hole 92 is moved into alignment with the hole 94 so that the groove 78' also remains under pressure. The channel 75 also remains connected to reservoir because when the plunger is shifted, a radial hole 172 is brought into alignment with the hole 173 in the groove 77'.

The connections for effecting rapid traverse movement of the table to the left are shown in Figure 10, from which it will be seen that the feed pump delivery line 104 is connected through the selector valve to the return line 101 and that the rapid traverse pump line 110 is connected to channel 44 leading to the right hand end of cylinder 40 and the line 43 is connected to the channel 113 for conveying fluid in the left hand end of cylinder 40 back to the reservoir 108.

The reciprocating cycle is utilized when two work fixtures are mounted on opposite ends of the table for alternately presenting work pieces to the cutter. This means that after one work piece is finished that the table is moved at a rapid traverse rate to present the work piece in the other fixture to the cutter as soon as possible and then the rate is changed to a feed rate during the subsequent cutting operation. To this end a dog 174 is attached to the table in the T-slot 163 for engagement with the lug 175 projecting from the side of the trip plunger as shown in Figure 4, the dog in this case having an inclined surface 176 for depressing the plunger. This will cause rotation of the rod 168 in a counterclockwise direction, as viewed in Figure 4, whereby the pilot plunger 81 will be rotated, or as shown in Figure 14 will be moved downward. The resulting hydraulic connections established by this new position are shown in Figure 8. It will be noted that no change in the longitudinal position of the pilot valve and therefore no change in the longitudinal position of the selector valve is effected, but a reversal of flow is effected in channels 75 and 76, whereby the selector valve is rotated to a new position.

In this position the rapid traverse pump is connected to reservoir and the delivery channel 104 of the feed pump is connected to motor channel 44 while motor channel 45 is connected to channel 101 for returning the exhaust fluid to the pump intake. This causes movement of the table to the left at a feed rate. At the end of the feeding movement in this direction, a second reversing dog 177 rotates the trip plunger 162 thereby moving the pilot valve plunger to the left to establish the connections shown in Figure 9. At the same time, however, a dog 178 carried by the table engages the positive stop 161.

Since, at this moment, there is no fluid pressure in channel 145 due to the position of the delay valve, longitudinal shifting of the selector valve will not take place and the feed pump will still be delivering fluid into channel 44. At the same time, it will be exhausting fluid from the return channel 101 thereby causing a drop in pressure in chamber 128 of the delay valve, and when this pressure drops below a predetermined point, the plunger 133 will move downward and eventually connect the pressure port 153 with port 152 and thereby shift the shuttle valve plunger 146 upward to interconnect pressure port 136 with port 138. Fluid pressure will then flow to channel 145 and shift the selector valve to the right and establish the connections shown in Figure 9. The cycle will then repeat itself. That is, the table will move at a rapid traverse rate toward the right until another dog 179 fastened in the T-slot 164 engages a lug 180 on the trip plunger and moves the same upward. This will establish the connections shown in Figure 13 in which the table will feed toward the right.

In addition to effecting a time delay in the reversal of table movement, it is desirable that the cutter spindle be stopped during rapid traverse movement of the table. The element that determines whether the table is moving at a feed rate or at a rapid traverse rate is the pilot valve plunger. Therefore, it is desirable to utilize this element for automatic control of the spindle clutch. When the delay unit is utilized, it will be apparent that the pilot valve plunger assumes its position an appreciable length of time before the reversal of the table is effected, which means that if the spindle clutch was connected for simultaneous movement with the pilot valve plunger, that the spindle would stop rotating the moment that the pilot valve plunger was tripped and the cutter would be at rest during the period of delay of the table and no benefit would be gained thereby since the idea of the delay is to hold the table at rest for an appreciable period of time so that the cutter can clean up the cut. It is therefore necessary to provide means whereby the spindle will remain rotating during the brief period of rest of the table and will stop rotating as soon as the table starts its new direction of movement. The necessary connections are still controlled to a certain extent by the pilot valve plunger.

Fluid operable mechanism has been provided for shifting the spindle clutch and comprises a piston 181 reciprocably mounted in a cylinder 182 and connected by a crank 183 to an oscillatable connecting sleeve 184. As shown in Figure 6, this sleeve has a crank arm 185 keyed thereto which is connected by a link 186 to a crank arm 187 which, as shown in Figure 2, has a ball and socket connection 188 to the collar 32 which, as previously described, is fastened to the spindle clutch shifter rod 30. It will now be apparent that as the piston 181 is moved from one end to the other of the cylinder 182 that the spindle clutch will be connected or disconnected. The connections are such that in Figure 13 movement of the piston 181 to the right will stop the spindle and movement to the left will start rotation of the spindle.

The opposite ends of cylinder 182 are connected by channels 189 and 190 to ports 191 and 192 of a spindle stop selector valve 193. When the automatic spindle stop mechanism is being utilized, the valve is in a position that annular grooves 194 and 195 connect ports 191 and 192 to ports 196 and 197 respectively. These last named ports are connected by channels 198 and 199 to channel 110 and port 200 of a control valve 201 respectively. It will be recalled that the channel 110 is the delay channel of the rapid traverse pump 106 and that this pump is only under pressure when the rapid traverse pump is connected for actuation of the table piston 39, because at other times it is being bypassed to reservoir. Since this channel is connected to the left end of cylinder 182, the pressure in this end of the cylinder will vary in accordance with whether the rapid traverse pump is being utilized to translate the table or not.

The control valve 201 has a pressure port 202 which is connected by branch line 203 to the feed pump supply channel 104 whereby the port 202 is always under pressure. This valve also has an exhaust port 204 which is connected to reservoir.

The position of this valve is controlled by the position of the pilot valve. As shown in Figure 3, the control valve 201 is connected to one end of a pivoted lever 205 which is continuously urged in a clockwise direction by a spring pressed plunger 206. This movement is limited and controlled, however, by a cam member 207 attached to the pilot valve shifter rod 168 which is engaged by a cam follower 208 attached to the remaining end of lever 205. The cam member 207 has two surfaces 209 and 210 which permit movement of the control valve 201 by the spring pressed plunger 206 into a first position whereby the port 200 is connected to the reservoir port 204 and no pressure is supplied to the right hand end of cylinder 182. It will be noted that the surfaces 209 and 210 are not in axial alignment. The cam member 207 is provided with two additional surfaces 211 and 212 which are at a greater radial length from the axis of the rod 168 than the surfaces 209 and 210, but connected to the surfaces 209 and 210 by inclined surfaces 213 and 214 respectively. In addition, the surface 211 is connected to the surface 210 by an inclined surface 215 and the surface 212 is connected to the surface 209 by the inclined surface 216. Due to these inclined surfaces, it will be noted that the follower is able to ride from any one of these surfaces to any other thereof regardless of the direction of movement of the shifter rod 168.

While the table is feeding toward the right as indicated by the connections in Figure 13, the right hand end of cylinder 182 is connected to reservoir and the left hand end of the cylinder is connected to the delivery line 110 of the rapid transverse pump. This pump, however, is connected to reservoir at this time and therefore the pressures in the opposite ends of cylinder 182 should be substantially equal. In order to insure that the piston 181 remains in the position shown, a small piston 217 slidably mounted in cylinder 218 is provided and this cylinder is connected by channel 219 to the feed pump delivery line 104. Since the pressure in line 104 is comparatively high, the area of piston 217 can be made very small, and this will be sufficient to insure that the piston 181 maintains the spindle clutch in a running position.

At the end of the feeding movement, the dog 166 will rotate the trip plunger 162 and shift the pilot valve operating rod 168 to the right as viewed in Figure 13, whereupon the cam surface 211 will rotate the lever 205 in a counterclockwise direction and shift the valve plunger 201 into a position connecting channel 199 with channel 220 which is a branch of the feed line 104. Since the pressure in line 104 will be rising at this time due to the fact that the table is in engagement with the positive stop, the spindle clutch will be held more positively in a running position, but after the delay is over and the selector valve is shifted into its new position and the connections are established as shown in Figure 10, the pressure in line 104 will drop immediately to an idling pressure and the pressure in channel 110 will rise due to its connection with cylinder 40. The pressure will now rise in the left hand end of cylinder 182 and drop in the right hand end until a sufficient differential is created to cause shifting of the cylinder 181 to the right and thereby cause disengagement of the spindle clutch.

When the work piece on the other end of the table is ready to be engaged by the cutter, a second trip dog carried by the table will engage the lug 180 and depress the trip plunger 162 and rotate the selector valve into a position to establish the connections shown in Figure 8. This will cause rotation of the pilot valve rod 168 and thereby present the cam surface 210 to the end of lever 205 whereby the spring will move the valve plunger 201 into a position connecting line 199 to reservoir. Since the selector valve is immediately shifted at this time without delay, the pressure will immediately drop in channel 110 and the rise in pressure in channel 104 will cause the piston 181 to shift to the left and thereby re-engage the spindle clutch.

When the table reaches the end of its cutting stroke, the rod 168 will again be shifted to the left and thereby cause the cam surface 212 to shift the valve 201 and after a period of delay, cause disengagement of the spindle clutch and a rapid movement of the table toward the right, and when the dog 176 again raises the trip plunger, the cam surface 209 will reposition the parts in the position shown in Figure 13.

When it is desired to disconnect the automatic spindle control, the selector valve 193 is moved to the left as viewed in Figure 13 by the shifter 221 which is secured to the shaft 222. This shaft, as shown in Figure 6, passes through the sleeve 184 and terminates, as shown in Figure 1, at the right hand end of the machine. At that point it is provided with a manually operable control lever 223 whereby the valve may be moved into either position. When the plunger 193 is shifted to the left, port 191 is connected to reservoir port 224 by the annular groove 194 and the port 192 is connected to the pressure port 225 by the annular groove 195. This insures that the left end of cylinder 182 is connected to reservoir and that pressure is continuously in the right hand end of cylinder 182 which thereby holds the spindle clutch continuously engaged.

The delay selector valve 63 is shown in Figure 13 in a central position in which it will cause a delay at both ends of the table stroke. When this valve is shifted to the right by the shifter fork 226, it will cause a delay at the right hand end of the table stroke, because the channel 139 is now connected through port 227, groove 69 and port 70 to channel 60 which leads to the cylinder at the right hand end of the selector valve. Shifting the valve plunger 63 also closes port 62 and port 140 and connects port 228, which is one terminus of the pressure line 220, to groove 141 and thereby to channel 145 whereby port 83 of the pilot valve 68 becomes a constant pressure port, so that any time that this port is connected for shifting the selector valve to the right, the same will take place immediately.

When the plunger 63 is shifted to the left, port 140 will again be closed and port 229, which is a second terminus of the pressure line 220, is still maintained connected to port 83 whereby the same is a constant pressure port and when this port is connected to channel 71, the fluid will immediately flow through groove 69 in channel 60 to the cylinder at the right hand end of the selector valve and the delay will be effected in the delivery of fluid to the left hand end of the valve because port 61 is now connected to port 230, which is one of the termini of channel 139, leading from the delay valve. Since port 65 is closed, the connection of the constant pressure port 83 to channel 66 will be ineffective.

It may be desirable at times to disconnect the delay mechanism entirely, in which case the channel 137 is connected to channel 139 by shifting of valve 231 shown in Figure 13 to the right, whereby branch 232 of channel 137 becomes connected to branch 233 of channel 139, and placing the delay selector valve 63 in a central position, whereby the channel 139 is connected to channel 145. This results in the fluid from pump supply line 104 directly to port 83 and makes it a constant pressure port.

There has thus been provided an improved control mechanism for a milling machine in which reversal of a reciprocable table may be obtained selectively at either end of the table stroke or at both ends of the stroke together with an automatic spindle stop mechanism which may be coupled to function only after the table starts to move after the period of delay has ended.

I claim:

1. In a milling machine having a cutter spindle and a work support, the combination with a transmission for actuating the spindle, including a motion interrupting clutch, of a fluid operable piston for shifting said clutch, a cylinder containing said piston, means for actuating said work support, including a feed line and a rapid traverse line, means connecting said lines to the respective ends of said cylinder for actuation of said piston.

2. In a machine tool having a tool spindle and a movable work support, the combination of power operable means for actuating said spindle, including a motion interrupting clutch, fluid operable means for shifting said clutch, including a piston, fluid operable means for actuating said work support, including a feed channel and a rapid traverse channel, means permanently connecting one of said channels for exerting pressure on one end of said piston, and means for selectively connecting the other channel for exerting pressure on the other end of said piston, whereby pressure differentials in said channels may be utilized for actuating said clutch.

3. In a machine tool having a rotary cutter and a work support movable relative thereto, the combination of power operable means for rotating said cutter, including a fluid operable motion interrupting clutch, fluid operable means for actuating the work support, including a feed channel and a rapid traverse channel, means for supplying fluid to said channels under different pressures, means coupling said fluid operable means permanently to one of said channels, means to selectively couple said fluid operable means to the other of said channels or to reservoir, whereby pressure differentials may be set up in said fluid operable means in opposite directions for causing engagement or disengagement of said clutch.

4. In a machine tool having a rotatable part and a slidable part, the combination of power operable means for effecting actuation of said rotatable part, including a motion interrupting clutch, fluid operable means for engaging and disengaging said clutch, means for sliding said part at different rates, including a feed pump having a delivery channel and a rapid traverse pump having a delivery channel, means for permanently connecting the delivery channel of said rapid traverse pump for causing disengagement of said clutch, and means to selectively couple the delivery channel of said feed pump for causing engagement of said clutch.

5. In a machine tool having a fluid operable support and a power operable clutch for controlling rotation of a tool spindle, the combination of a feed pump for moving said support at feed rates, a rapid traverse pump for moving said support at a rapid traverse rate, and means responsive to the pressure differential in the fluid delivered by said pumps to cause engagement or disengagement of said clutch.

6. In a machine tool having a cutter spindle and a fluid operable work support, the combination with a clutch for controlling rotation of said spindle and a fluid operable piston for actuating said clutch, of a first pump for supplying fluid at an operating pressure to cause movement of said support, a second pump for supplying fluid to said support at an operating pressure, means to selectively connect said pumps for actuation of said support and thereby determine which of said pumps shall supply fluid at an operating pressure, means connecting said pumps to the opposite ends of said piston whereby the pump which is delivering fluid at an operating pressure will determine the position of said clutch.

7. In a machine tool having a cutter spindle and a work support, the combination of power operable means for rotating said spindle, including a motion interrupting clutch, a fluid operable piston operatively connected for engaging and disengaging said clutch, a pair of pumps, means to selectively connect one of said pumps for actuation of said support and causing the other pump to idle, and means responsive to the pressure differential between the actuating pressure and the idling pressure of said pumps for causing actuation of said piston.

8. A milling machine having a cutter spindle and a work support, a separate power operable motor for actuating each of said elements, a clutch for controlling actuation of the spindle by one of said motors, a selector for determining the rate of operation of the other motor, means trip operable by the table for variably positioning said selector, said trip operable means including a preselector for determining engagement or disengagement of said clutch, and subsequently operable means for effecting said engagement or disengagement when the support is ready to move at the new rate.

9. A milling machine having a tool spindle and a work support, power operable means for actuating said spindle, including a main control clutch, a piston operatively connected for engaging or disengaging said clutch, a cylinder containing said piston, a fluid operable motor for actuating said table, a feed pump, a rapid traverse pump, a selector valve for alternately coupling said pumps to the motor for actuation at fast and relatively slow rates, pilot control means for said selector valve, including trip dogs carried by the table, said pilot means including a valve for connecting one end of said cylinders to the feed pump or to reservoir, means permanently connecting the rapid traverse pump to the other end of said cylinder, and means operable by the pilot valve when connecting the feed pump for table actuation to connect the rapid traverse pump to reservoir whereby the pressure of the feeding pump will cause engagement of said clutch and thereby rotation of said spindle.

10. In a milling machine having a tool spindle and a work support, the combination of power operable means for rotating said spindle, including a control clutch, fluid operable means for shifting said table, including a rate and direction control valve, fluid operable means for shifting said valve, a pilot valve having fluid connections to said fluid operable means, trip operable means actuable by dogs mounted on the table for shifting said pilot valve, a source of pressure, means to delay the flow of pressure to said pilot valve means after a new shifting movement thereof, and means operable after the delay means has coupled pressure to said pilot valve and caused the selector valve to be shifted to a new position to effect shifting of said clutch.

11. In a milling machine having a power operable tool spindle and a clutch for controlling actuation thereof, the combination with a movable work support of a hydraulic control circuit, including a fluid operable motor operatively connected to said support, of a feed pump, a rapid traverse pump, a selector valve for determining the coupling of said pumps to said motor, a pilot valve for determining the position of the selector valve, a valve for delaying the flow of fluid pressure to said pilot valve after each actuation thereof, and thereby delay the shifting of said selector valve, and means operable upon shifting movement of the selector valve to shift said clutch.

12. In a milling machine having a cutter spindle and a work support, power operable means for rotating said spindle, including a clutch, a hydraulic motor for actuating the table, a feed pump for delivering fluid under pressure to said motor to cause relative movement between the work support and the spindle at a feeding rate, fluid operable means for engaging said clutch, means to supply fluid pressure from said feed line to cause engagement of said clutch during the feeding operation, a rapid traverse pump, a selector valve shiftable to disconnect said feed pump from said motor and connect the rapid traverse pump thereto, means trip operable by the table for causing power shifting of said selector valve, means to delay said power shifting whereby the rapid traverse movement will not take place until an appreciable time after said tripping, means operable by said trip means for disconnecting said feed pump from the fluid operable clutch shifter, and means responsive to an operating pressure created by said rapid traverse pump to cause disengagement of said clutch.

13. In a transmission and control mechanism for milling machines, the combination with a reverser for changing the direction of movement of a movable part of the machine, of fluid operable members for shifting said reverser, a pilot control valve having an intake port and two delivery ports, trip operable means in the pilot valve to selectively couple said intake port to said delivery ports, a delay selector valve having means for selectively coupling one of said fluid operable members to the delay valve mechanism and the other member to one of said delivery ports, and additional means for simultaneously closing the other of said delivery ports and connecting a source of pressure to said intake port, whereby delivery of fluid pressure will be effected immediately to one of said fluid operable members and will be delayed to the other of said members when said pilot valve is tripped.

14. In a transmission and control mechanism for milling machines, the combination with a reverser for changing the direction of movement of a movable part of the machine, of fluid operable members for shifting said reverser, a pilot control valve having an intake port and two delivery ports, trip operable means in the pilot valve to couple said intake port selectively to said delivery ports, a delay valve mechanism, a selector valve having means for coupling one of said fluid operable members to the delay valve mechanism and the other member to one of said delivery ports, additional means for simultaneously closing the other of said delivery ports and connecting a source of pressure to said intake port whereby delivery of fluid pressure will be immediately effected to one of said fluid operable members, and will be delayed to the other of said members when said pilot valve is tripped, and means to position said selector valve to determine which of said fluid operable members will be delayed.

15. In a transmission and control mechanism for milling machines having a shiftable reverser for changing the direction of a movable part of the machine, the combination with fluid operable members for shifting said reverser, of a pilot control valve having an intake port and two delivery ports, means to selectively couple said intake port to one of said delivery ports, and to connect the other delivery port to reservoir to cause reversible shifting of said reverser; a delay valve mechanism, a delay selector valve having a first position for connecting said delay valve mechanism to said intake port and simultaneously connecting said delivery ports to the respective fluid operable members, whereby a delay will be effected in the shifting of each, said selector valve having additional positions on either side of said first position for disconnecting one of said fluid operable parts from the delivery port, and connecting the same to said delay valve mechanism, and simultaneously connecting a source of pressure to said intake port, whereby one of said fluid operable members will be immediately actuated upon tripping of said pilot valve and the other will be delayed.

16. In a transmission and control mechanism for a milling machine, the combination with a pilot valve for determining the rate and direction of movement of a shiftable part of the machine, of a feed pump, means operable by the pilot valve to connect said feed pump for actuation of the shiftable part, a spindle control clutch having a fluid operable shifter for engaging said clutch, an auxiliary control valve for said shifter having an operating lever, cam portions on said punger for engaging a follower attached to said lever, said cam portions lying in different planes whereby in one position of said pilot valve plunger, said auxiliary control valve will be positioned to connect pressure to said fluid operable part and in another position will connect said part to reservoir.

17. In a machine tool having cooperating relatively movable parts, a hydraulic operating circuit for one of said parts including a control valve, a transmission for the other part including a shiftable motion interrupter, said control valve being longitudinally movable for determining different circuit effects, separate sources of pressure for producing each of said effects, one of said sources of pressure having a pipe connection to said motion interrupter, means responsive to one position of said control valve for impounding the fluid in said pipe connection to raise the pressure thereof to effect shifting of said motion interrupter to its motion interrupting position, and additional means operated by said control valve when shifted to a second position to connect the other source of pressure for shifting said motion interrupter to a motion producing position.

18. In a machine tool having a power operated part and a motion interrupter therefor, the combination of a fluid operable member for shifting said interrupter, a first pump having a pipe connection to said member, a second pump, means to selectively connect said pumps to load whereby when said first named pump is connected to load the pressure will rise in said pipe connection to cause shifting of said fluid operable member, and means operable when said second named pump is connected to load to effect connection of the pump to said fluid operable member for shifting it in an opposite direction.

19. In a machine tool having cooperating relatively movable parts, a hydraulic operating circuit for one of said parts including a control valve, a transmission for the other part including a shiftable motion interrupter, said control valve being longitudinally movable for determining different circuit effects, separate sources of pressure for producing each of said effects, one of said sources of pressure having a pipe connection to said motion interrupter, means responsive to one position of said control valve for impounding the fluid in said pipe connection to raise the pressure thereof to effect shifting of said motion interrupter to its motion interrupting position, additional means operated by said control valve when shifted to a second position to connect the other source of pressure for shifting said motion interrupter to a motion producing position, and means to render said control valve ineffective for shifting said motion interrupter.

20. In a machine tool having cooperating relatively movable parts, a hydraulic operating circuit for one of said parts including a control valve, a power train for the other part including a shiftable motion interrupter, said control valve being rotatable to a first position for causing said circuit to produce a first effect and to a second position for causing said circuit to produce a second effect, separate pumps for producing the respective effects, one of said pumps having a pipe connection to the motion interrupter, means operable when the control valve is rotated to one position for impounding the fluid in said pipe connection to raise the pressure thereof and effect shifting of said motion interrupter to a motion interrupting position, and other means operable by said control valve when rotated to a second position to connect the other pump for shifting said motion interrupter to a motion producing position.

HERMAN HORLACHER.